US009230274B2

(12) United States Patent
Dennard et al.

(10) Patent No.: US 9,230,274 B2
(45) Date of Patent: Jan. 5, 2016

(54) SYSTEM AND METHOD FOR RFID DYNAMIC CONTENT PRESENTATION

(75) Inventors: Mark D. Dennard, Decatur, GA (US); Randy S. Johnson, Ofallon, MO (US); Ellen L. Lewis, Atlanta, GA (US); Tedrick N. Northway, Wood River, IL (US); Michael P. Outlaw, Dallas, GA (US); Matthew B. Trevathan, Kennesaw, GA (US)

(73) Assignee: International Business Machines Corporation, Armonk, NY (US)

(*) Notice: Subject to any disclaimer, the term of this patent is extended or adjusted under 35 U.S.C. 154(b) by 146 days.

(21) Appl. No.: 13/471,896

(22) Filed: May 15, 2012

(65) Prior Publication Data

US 2012/0223815 A1    Sep. 6, 2012

Related U.S. Application Data

(62) Division of application No. 11/845,629, filed on Aug. 27, 2007, now abandoned.

(51) Int. Cl.
*H04Q 5/22* (2006.01)
*G06Q 30/06* (2012.01)
*G06Q 10/08* (2012.01)

(52) U.S. Cl.
CPC ............. *G06Q 30/06* (2013.01); *G06Q 10/087* (2013.01)

(58) Field of Classification Search
CPC ........ G06K 7/01; G06Q 10/087; G06Q 30/06; H04Q 5/22
USPC ......................................... 340/10.1
See application file for complete search history.

(56) References Cited

U.S. PATENT DOCUMENTS

| | | | |
|---|---|---|---|
| 2003/0120745 A1 | 6/2003 | Katagishi et al. | |
| 2003/0220835 A1* | 11/2003 | Barnes, Jr. | G06Q 10/1053 705/14.36 |
| 2005/0245271 A1 | 11/2005 | Vesuna | |
| 2006/0047464 A1 | 3/2006 | Kumar et al. | |
| 2006/0053057 A1 | 3/2006 | Michael | |
| 2006/0071778 A1 | 4/2006 | Vesikivi et al. | |
| 2006/0094405 A1* | 5/2006 | Dupont | H04M 17/02 455/414.1 |
| 2006/0123041 A1 | 6/2006 | Sandrini et al. | |

(Continued)

FOREIGN PATENT DOCUMENTS

| | | |
|---|---|---|
| JP | 11159109 A * | 6/1999 |
| WO | 2006-005148 | 1/2006 |

OTHER PUBLICATIONS

Notice of Allowance dated Nov. 26, 2013 in related U.S. Appl. No. 11/845,629, 7 pages.

(Continued)

*Primary Examiner* — George Bugg
*Assistant Examiner* — Anthony D Afrifa-Kyei
(74) *Attorney, Agent, or Firm* — Matthew Chung; Roberts Mlotkowski Safran & Cole, P.C.

(57) ABSTRACT

A system and method for providing RFID dynamic content presentation using wireless devices and RFID technologies. The method comprises providing a wireless capable device which is configured to receive RFID information and store the RFID information in storage for later retrieval. The system is an infrastructure which comprises at least one RFID tag which stores RFID information; and a wireless capable device which is configured to receive the RFID information and store the RFID information in storage for later retrieval.

15 Claims, 5 Drawing Sheets

(56) References Cited

U.S. PATENT DOCUMENTS

| | | | |
|---|---|---|---|
| 2006/0136292 A1 | 6/2006 | Bhati et al. | |
| 2006/0178816 A1* | 8/2006 | Dickin et al. | 701/207 |
| 2006/0224450 A1* | 10/2006 | Moon | G06Q 30/02 |
| | | | 705/14.36 |
| 2006/0267730 A1 | 11/2006 | Steinke et al. | |
| 2007/0017983 A1* | 1/2007 | Frank | G06Q 10/087 |
| | | | 235/385 |
| 2007/0080785 A1* | 4/2007 | Son | G06K 7/10079 |
| | | | 340/10.1 |
| 2007/0143853 A1 | 6/2007 | Tsukamoto | |
| 2008/0074266 A1 | 3/2008 | Ohashi et al. | |
| 2008/0238618 A1* | 10/2008 | Goteti et al. | 340/10.1 |
| 2008/0242274 A1* | 10/2008 | Swanburg | G06Q 20/3223 |
| | | | 455/414.1 |
| 2009/0224892 A1 | 9/2009 | Nicholls | |
| 2009/0315670 A1 | 12/2009 | Naressi et al. | |
| 2010/0013603 A1 | 1/2010 | Chatani et al. | |
| 2010/0164689 A1 | 7/2010 | Napolitano | |

OTHER PUBLICATIONS

Office Action dated Jul. 18, 2013 in related U.S. Appl. No. 11/845,629, 15 pages.

* cited by examiner

SYSTEM AND METHOD FOR RFID DYNAMIC CONTENT PRESENTATION

CROSS REFERENCE TO RELATED APPLICATION

This application is a divisional application of copending U.S. patent application Ser. No. 11/845,629 filed on Aug. 27, 2007, the contents of which are incorporated herein by reference in their entirety.

FIELD OF THE INVENTION

The invention generally relates to a system and method for mobile (wireless) systems and, more particularly, the invention relates to a system and method for RFID dynamic content presentation using wireless devices and RFID technologies.

BACKGROUND OF THE INVENTION

Wireless and other types of technology have become ubiquitous in today's daily life. These wireless technologies include cellular telephones, the Internet, wireless Internet access (WiFi), GPS and RFID technologies, to name a few. These technologies are used over a broad range of applications, including personal usage to consumer transactions, to entertainment to business to business applications. As such, these technologies have evolved over the years to become increasingly more important to business transactions, including retail transactions, etc.

For example, RFID technology is used to track merchandise throughout the supply chain, including the purchasing of merchandise by the consumer. GPS, on the other hand, is used for personal usage to find retail outlets, residential locations, etc. Likewise, WiFi is used to access the Internet from many different locations, for many different types of usages, including personal and business usage. This technology allows a user to conduct business regardless of their whereabouts, with the caveat that they are near a WiFi hub.

Many technologies have evolved in such a way that the combination of the technologies have provided a synergistic effect. This, as such, has increased the effectiveness and workability of the technology to such an extent that they play a critical role in business. As an illustrative example, the combination of the Internet and WiFi has made the Internet that much more accessible to a user, regardless of their location. This allows the user to conduct business transactions more efficiently, such as track inventory, purchase items and maintain contact with an array of business associates and colleagues.

However, there is a need to increase the synergistic effects of different technologies. By doing so, it would be possible to increase the ability and efficiency to transfer and/or obtain content. Accordingly, there exists a need in the art to overcome the deficiencies described hereinabove.

BRIEF SUMMARY

In a first aspect of the invention, a method comprises providing a wireless capable device which is configured to receive RFID information and store the RFID information in storage for later retrieval.

In another aspect of the invention, the method provides content using RFID. The method comprises providing an infrastructure operable to receive RFID information and location information associated with the RFID information on a wireless device. The method includes storing the RFID information in storage for later retrieval.

In another aspect of the invention, an infrastructure comprises at least one RFID tag which stores RFID information; and a wireless capable device which is configured to receive the RFID information and store the RFID information in storage for later retrieval.

In another aspect of the invention, a computer program product comprises a computer usable medium having readable program code embodied in the medium. The computer program product includes at least one component to receive RFID information from an RFID tag in a vicinity of a computing device associated with the computer program product and store the RFID information in storage for later retrieval.

DETAILED DESCRIPTION OF EMBODIMENTS OF THE INVENTION

Figure 1:
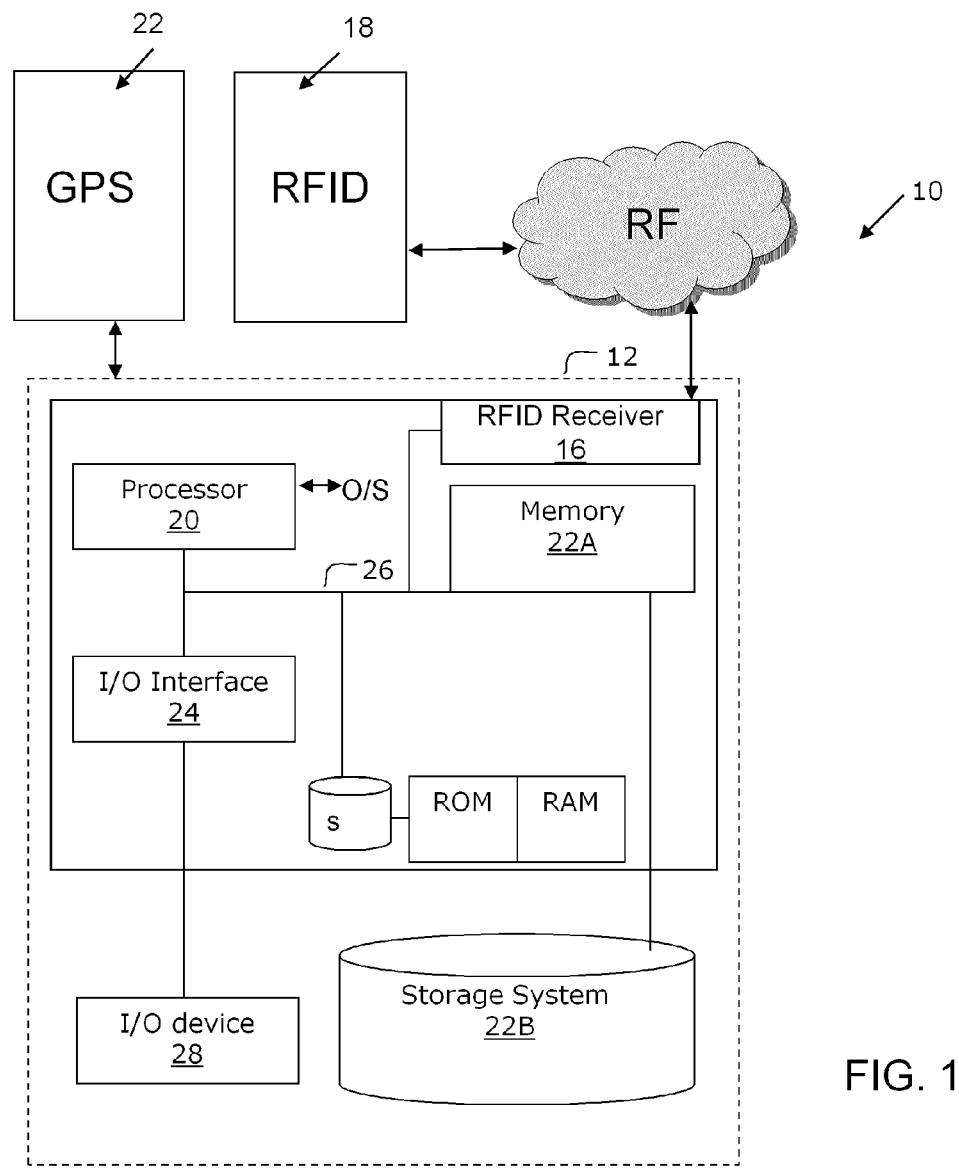
FIG. 1 shows an illustrative environment for implementing the invention.

The proliferation of wireless devices and RFID (Radio frequency identification) tags are capable of providing a medium to combine the real time abilities of the RFID tags along with the world wide web. The invention generally relates to a system and method for mobile systems and, more particularly, the invention relates to a system and method for RFID dynamic content presentation. In embodiments, the invention leverages the use of RFID technology and more specifically RFID tagging, and the wireless ability of wireless devices to permit the retrieval of information from objects having an RFID tag, for example. These objects may include applications related to, for example, realty, dining, lodging, retail, entertainment, etc. Thus, in use, the invention allows a user with a wireless device to access information about a particular object when in the vicinity of the object and more specifically the RFID tag.

Overview

The information contained in the RFID tag can either be accessed directly (e.g., for simple items) by the wireless devices and, as such, shown on its display. This information may include, for example, type of product or service, price, contact information, etc. In further embodiments, the system and method of the invention leverages the use of the RFID technologies and wireless devices to allow the user to retrieve information associated with the object from a website, web service, and telephone message or contact number and, as such, receive live or updated data related to the object. The information (e.g., URL) may be stored in the wireless device or displayed as a website on the wireless device.

As such, in one example, the RFID tag can store a URL which is transmitted to the wireless device, via RF. Once the URL is received, the wireless device can store this information for later retrieval or immediately access the website or web service in order to obtain information about the object.

Thus, the wireless device includes the option to either store the data or retrieve the information from the web/phone message.

In embodiments, the wireless device can actively seek RFID tags or passively receive RFID related information when in the vicinity of the RFID tag. In further embodiments, the wireless device can be programmed to filter the RFID information such as, for example, filter different categories or subcategories, as desired by the user. For example, the user may filter out all RFID information associated with dining or more specifically all seafood establishments. The user may also filter out certain information associated with the RFID information such as, for example, price, location, etc.

The wireless device can also be programmed to alert the user of certain categories using tonal alerts, colors, etc. For example, upon receiving RFID information relating to dining, the wireless device may ring a predetermined tone. The categories, tones, filtering options, etc. may be stored in memory or storage within the wireless device.

In still further embodiments, the RFID information may include location information which, in combination with GPS or radio frequency triangulation, may provide the user with directions or the exact location of the transmitting RFID tag.

As further examples, many different types of situations and related information are contemplated by the invention. These situations, amongst others, include realty, dining, lodging, theaters, retail, etc. implementations, as discussed below.

Realty

In a realty situation, the information obtain from the RFID tag can include most any type of information. For example, in one implementation, the system and method of the invention allows a passerby (e.g., prospective client) to evaluate a house on the market when passing a house for sale. In this example, the client may query the RFID enabled "For Sale" sign and the embedded RFID tag returns specific data about the home to the wireless device. Simple information can be stored in the RFID tag data fields such as home price and square footage. For detailed information, the wireless device could retrieve the information from the website specified by the RFID tag, save the URL for later review, download the website data for further review, dial an informational telephone number and play or store the information provided.

Dining

In a dining or other entertainment situation, the information obtained from the RFID tag can include most any type of information. By way of example, as the client passes by a dining establishment, the wireless device would query the RFID enabled sign and receive information on the specials and costs, hours of operation, child-friendliness, etc. Again, for detailed information, the wireless device could retrieve the information from the website specified by the RFID tag, save the URL for later review, download the website data for further review, dial an informational telephone number and play or store the information provided.

Lodging

In a lodging or other entertainment situation, the information obtained from the RFID tag can include most any type of information. By way of example, as the client passes by a lodging establishment, the wireless device would query the RFID enabled sign and receive information on the room availability, costs, amenities, child-friendliness, etc. Again, for detailed information, the wireless device could retrieve the information from the website specified by the RFID tag, save the URL for later review, download the website data for further review, dial an informational telephone number and play or store the information provided.

Theaters

In a theater or other entertainment situation, the information obtained from the RFID tag can include most any type of information. By way of example, as the client passes by a theater establishment, the wireless device would query the RFID enabled sign and receive information on the times, available seating and the cost of admission, etc. Again, for detailed information, the wireless device could retrieve the information from the website specified by the RFID tag, save the URL for later review, download the website data for further review, dial an informational telephone number and play or store the information provided.

Retail

In a retail situation, the information obtained from the RFID tag can include most any type of information. By way of example, as the client passes by a retail establishment, the wireless device would query the RFID enabled sign or product and receive information on sales, merchant information, product information, etc. The information can be used to draw customers into their stores. In the retail environment, the RFID information may include (digital) coupons pushed to the wireless device. Again, for detailed information, the wireless device could retrieve the information from the website specified by the RFID tag, save the URL for later review, download the website data for further review, dial an informational telephone number and play or store the information provided.

System Environment

FIG. 1 shows an illustrative environment 10 for managing the processes in accordance with the invention. The illustrative environment may represent a wireless device 12 in communication with an RFID tag 14 via short range RFID transmissions, well known to those of skill in the art. The wireless device 12 and, more particularly, an RFID receiver 16 receives information from the RFID tag 18, via short range RFID transmissions. A processor 20 may receive location information from GPS or transmitting towers generally represented as reference numeral 22.

The processor 18 can perform the processes described herein. For example, using the wireless device described herein, realty, dining, lodging, theaters, retail, etc. related information may be obtained by the RFID receiver 16, which is stored and transmitted from the RFID tag 18, via short range RFID transmissions, to the RFID receiver 16. The RFID receiver 16 provides such information to the processor 20 for processing the information. Also, the RFID receiver 16 and/or processor 20 may provide such information to storage 22B for later retrieval, as discussed in more detail below.

In particular, the processor 20 makes the wireless device 12 operable to obtain and process information associated with RFID tags in accordance with the invention, e.g., process described herein. The processor 18 can be programmed by one of skill in the art, understanding the invention herein, to actively or passively seek RFID tags, filter certain RFID information, alert the user of certain categories using tonal alerts, colors, etc., and store the retrieved information for future use and display, etc, all of which are discussed herein.

The processor 20 is coupled to the RFID receiver 16, a memory 22A, an input/output (I/O) interface 24, storage device 22B and an external I/O device/resource 28, via a bus 26. The wireless device 12 also includes ROM, RAM and any known operating system. The RFID receiver 16 receives information from the RFID tag, and provides this information to the processor 20 and memory 22A and/or storage device 22B.

The information may also be provided to the external I/O device/resource 28, which may be representative of a display. This information may be pricing information, sale information, location information, website information (e.g., URL), telephone number, etc. All of this information may be stored in the storage device 22B for later retrieval. It should be understood that the external I/O device/resource 28 may also represent a keypad or other external device such as pointing devices. This may be used to program the wireless device in accordance with the invention. For example, the user may implement filtering devices, tonal alerts, etc. using the keypad and/or pointing device. In any event, the I/O device 28 can comprise any device that enables an individual to interact with the wireless device 12.

The memory 22A can include local memory employed during actual execution of program code, bulk storage, and cache memories which provide temporary storage of at least some program code in order to reduce the number of times code must be retrieved from bulk storage during execution. The RFID information may also be temporarily stored in the memory 22A.

In general, the processor 18 executes computer program code, which is stored in memory 22A and/or storage system 22B. While executing computer program code, the processor 18 can read and/or write data to/from memory 22A, storage system 22B, and/or I/O interface 24. The bus 26 provides a communications link between each of the components in the wireless device 12.

The wireless device 12 can comprise any general purpose computing article of manufacture capable of executing computer program code installed thereon (e.g., a personal computer, server, handheld device, etc.). However, it is understood that the wireless device 12 is only representative of various possible equivalent computing devices that may perform the processes described herein. To this extent, in embodiments, the functionality provided by the wireless device 12 can be implemented by a computing article of manufacture that includes any combination of general and/or specific purpose hardware and/or computer program code. In each embodiment, the program code and hardware can be created using standard programming and engineering techniques, respectively.

Exemplary Implementation of the System of the Invention

Figure 2:
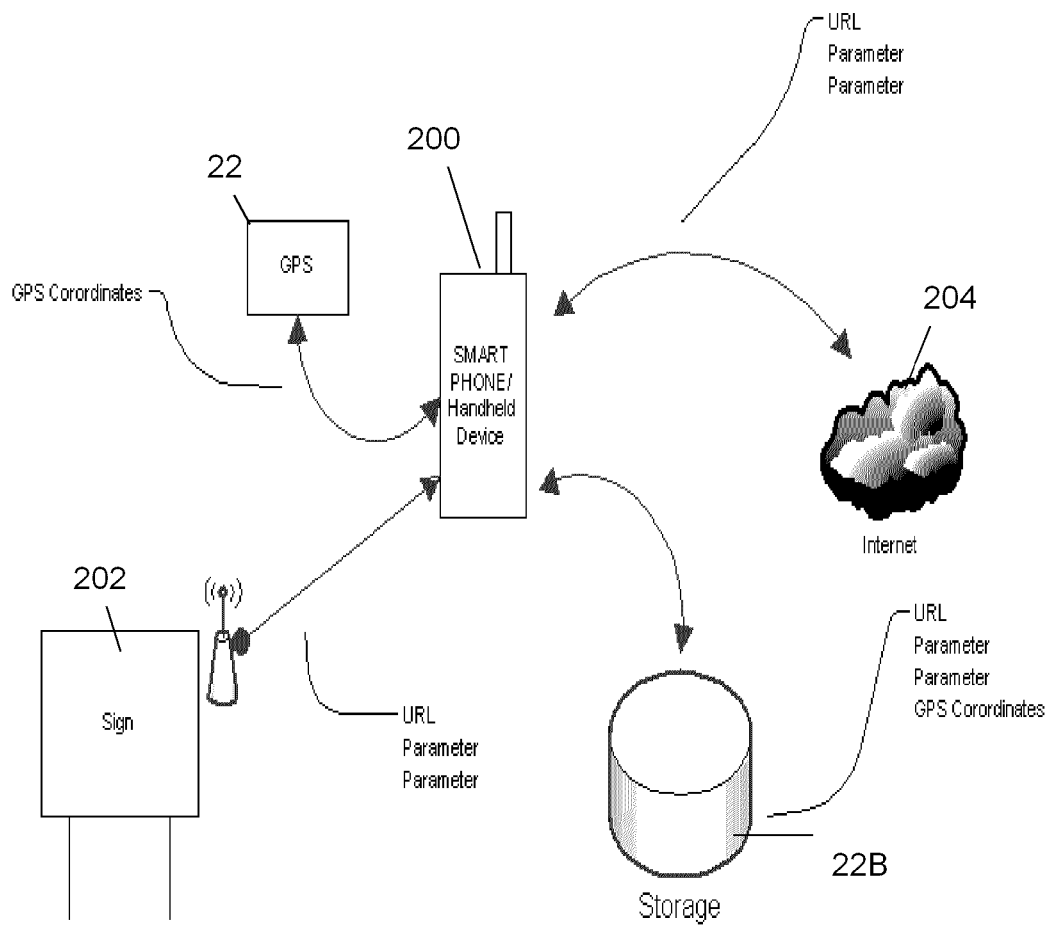
FIG. 2 shows an implementation of the invention, with an example of a sign equipped with an RFID tag in accordance with the invention.

FIG. 2 shows an exemplary system in accordance with the invention. In this system, the wireless device is a handheld smart phone 200. The handheld smart phone 200 may include storage 22B to store information such as GPS coordinates received from the GPS 22 or information associated with sign 202, e.g., URL, product information, which is transmitted to the handheld smart phone 200 via short range RF technology. The information, as discussed herein, may be URL information, product information, etc. Using the URL, the handheld smart phone 200 may access the Internet 204 in order to download a website or web service information related to the sign 202.

In embodiments, a service provider, such as a Solution Integrator, can update the website associated with the URL with information related to the related service, entertainment venue, product, etc., which is of interest to the user. This allows information associated with the RFID tag to be updated in real-time or near real-time, allowing the user to access the most recent information associated with the RFID tag. So, instead of replacing an RFID tag to update information, the service provider, can access and update a website with pertinent information related to the RFID. In this manner, when the URL is transmitted to the user, the user can simply gain access to the website associated with the RFID and, in accordance with the invention, obtain the most recent information for the service, product, entertainment venue, etc.

Exemplary Processes in Accordance with the Invention

Figure 3:
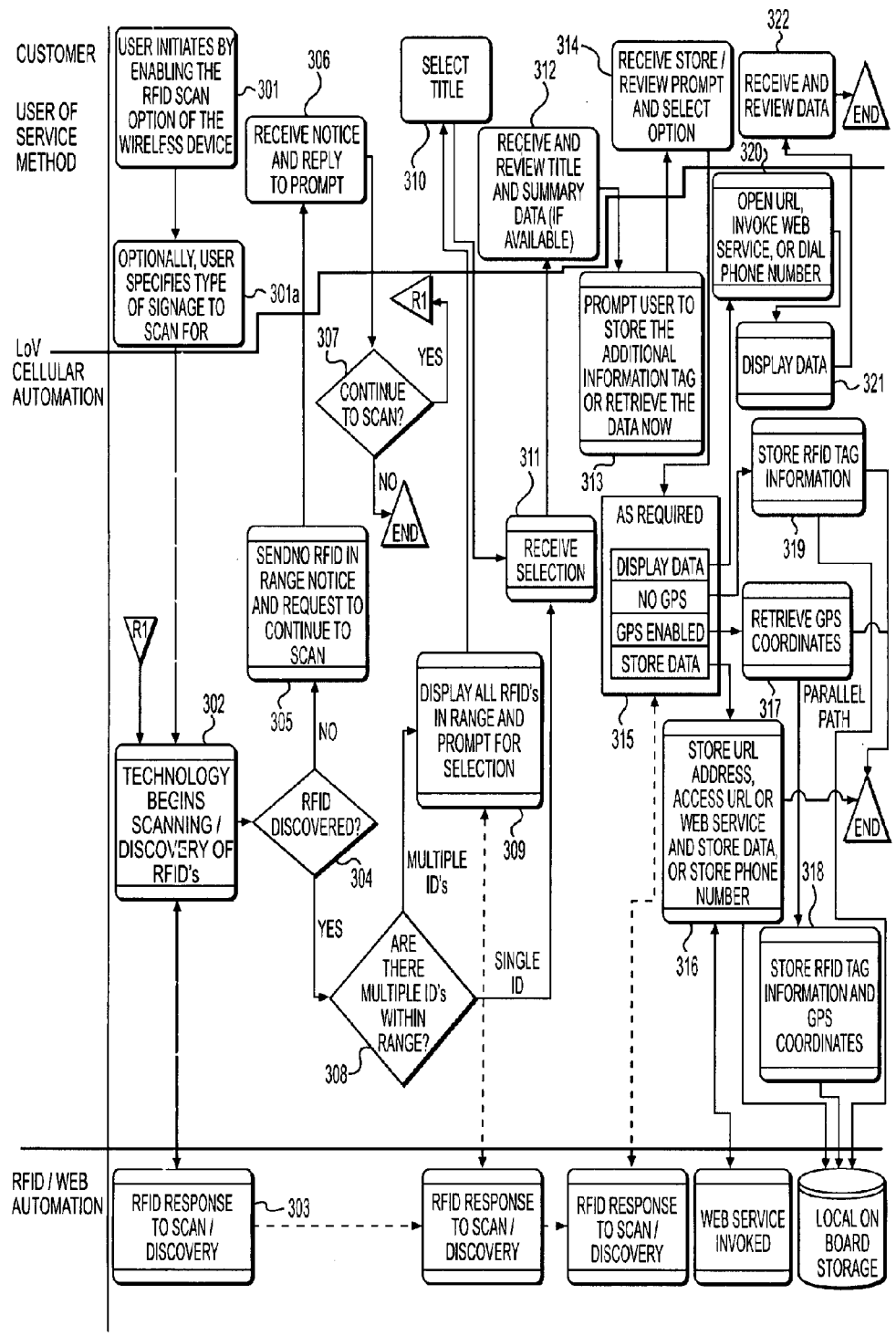
FIG. 3 shows a flow chart implementing processes in accordance with aspects of the invention.

FIG. 3 is a flow diagram showing processing steps of embodiments of the invention. FIG. 3 may equally represent a high-level block diagram of components of the invention implementing the steps thereof. The processing steps of FIG. 3 may be implemented on computer program code in combination with the appropriate hardware. The processing steps of FIG. 3 can be implemented in the environment of FIG. 1.

The computer program code may be stored in storage 22B, which may be representative of storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network.

The invention can take the form of an entirely hardware embodiment or an embodiment containing both hardware and software elements (any of which is referred generally as "file management program"). The hardware and software elements include a computer infrastructure configured to implement the functionality of the present invention. The computer infrastructure may take the form, for example, of the environment of FIG. 1. The software elements may be firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

In embodiments, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement.

Referring to FIG. 3, at step 301, a user Initiates the processes by enabling the RFID scan option of the wireless device. As desired by the user, the wireless device is activated and the RFID function is selected. Optionally, at step 301a, the user specifies the type of signage, e.g., category or subcategory, using the filtering device. By example, the user may select to receive information related only to lodging.

At step 302, the wireless device scans for RFID tags. In this processing step, the wireless device may discover an RFID tag associated with a desired category or categories. At step 303, the signage, e.g., various businesses, etc., with enabled RFID technology will respond to polling by the wireless device. At step 304, a determination is made as to whether the RFID has been discovered.

If there is no discovery of RFID at step 304, the process proceeds to step 305. At step 304, the system sends a no discovery notice and requests to continue to scan. The request is sent to the user. The system also prompts the user as to whether the device should continue to scan or terminate the function. At step 306, the user receives the notice and responds to the same. For example, the user responds to the prompt by indicating whether the system should continue to scan or not. The user submits the desired action via the wireless device, via the keypad or other device. If the user wishes to continue, the process reverts to step 302, otherwise the process ends. If the user wishes to continue, the process will begin the scanning process again within a predetermined time period selected by the user or service, e.g., 20 minutes.

If the process discovers an RFID at step 304, the process proceeds to step 308. At step 308, a determination is made as to whether there are multiple RFIDs within the range of the wireless device. After there is a discovery of one or more RFIDs, the discovery is sent to the wireless device for review and a determination as to whether there are multiple RFIDs.

If more than one RFID is found, the system will display all of the RFIDs in range and prompt the user for a selection, at step 309. Thus, at step 309, the system requests that the user select a title from the list of displayed RFIDs. These titles may have already been filtered. At step 310, the user selects a title for display and/or storage, from the ID titles found and reviewed by the user. The user may select the selection using a keypad or other external device. At step 311, the system receives and displays the selection. Alternatively, if there is only one RFID found, the process continues directly to step 311.

At step 312, the user receives and reviews the data associated with the RFID. At step 313, the process prompts the user to store the information in storage. Alternatively, the information can be automatically placed in storage, depending on a user preference. At this step, process can also prompt the user to retrieve the data. At step 314, the user receives the prompt and replies via the wireless device. The user can also select an option such as, for example, to display a website, any of which is provided on demand.

At step 315, the wireless device receives the user's selection and performs as requested. For example, if the user requested to display data, the wireless device can open a URL, invoke a web service to obtain information or dial a telephone all associated with the tag, to name a few options (step 320). As other processes to perform, the wireless device can store RFID tag information (step 319) (if there is no GPS), proceed to retrieve and/or determine GPS coordinates (step 317) and store the coordinates (step 318), amongst other features. In alternative embodiments, the process can perform radio frequency triangulation (and store the coordinates of the radio frequency triangulation). At step 316, the process can store the URL address, access URL or web service, store data, or telephone number, amongst other features. All storing processes can be run in parallel, in accordance with an aspect of the invention.

At step 321, the process of the invention, the requested data is presented to the user. For example, the process prepares the data for review and sends the information to the wireless device. At step 322, the user receives the requested data and reviews the requested data on the display of the wireless device. When complete, the process ends. Thus, the service is complete for the requested actions and no further action is required.

Exemplary Screen Displays on a Wireless Device

FIGS. 4A-4D show various displays on a wireless device in accordance with aspects of the invention. The wireless device may be, for example, a PDA, a cellular telephone, a portable computer equipped with WiFi, etc. As discussed above with regard to FIG. 1, each of the portable devices would include an RFID and, in embodiments, a GPS receiver. In other embodiments, the processor of the wireless device may include programming to perform radio frequency triangulation.

Figures 4A, 4B:
FIGS. 4A-4D show various displays of a wireless device in accordance with aspects of the invention.

In FIG. 4A, the display is showing several different options, any of which may be selected by the user. These options may include filtering options such as, for example, realty, dining, lodging, entertainment, etc. The options may also include enabling or disabling tonal alerts, associated with any or all of the filtering options, amongst others. FIG. 4A can also represent prompts given to the user, as noted above in the processes of the invention. For example, if there are no RFID tags found, the display may request the user to respond to the prompt by indicating whether the system should continue to scan or not for RFID.

FIG. 4B is representative of simple items such as price, contact information, etc. In further embodiments, FIG. 4B can be representative of a website or web service. In either case, the information obtained by the wireless device (in addition to the user options) can be stored in storage. The information can include the URL.

Figures 4C, 4D:
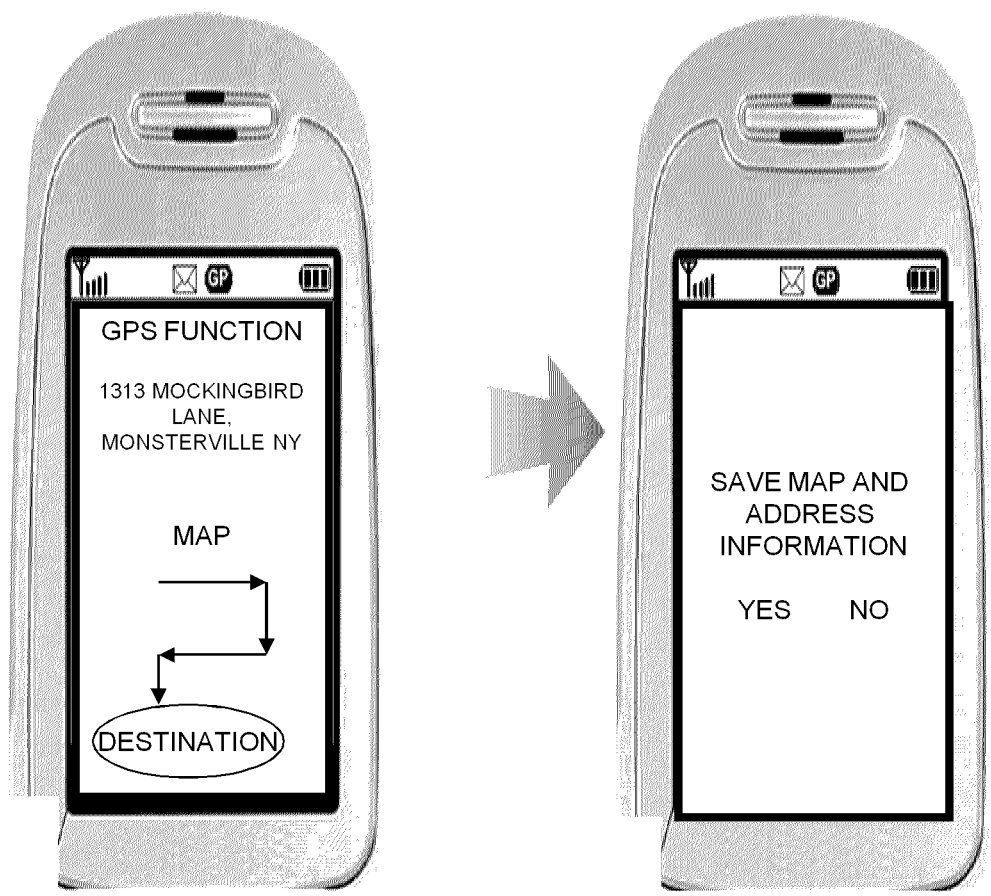

FIG. 4C is representative of a map, providing directions to a home for sale. The map may also provide an address of the home for sale. This information may be stored in storage for future retrieval. FIG. 4D shows a prompt requesting the user to save the information.

While the invention has been described in terms of embodiments, those skilled in the art will recognize that the invention can be practiced with modifications and in the spirit and scope of the appended claims.

What is claimed is:

1. A method for providing content using RFID, comprising:
   providing an infrastructure operable to:
   enable an RFID scan, by a wireless device, for specific categories;
   scan for one or more RFID tags using the wireless device;
   detect the one or more RFID tags;
   filter the one or more RFID tags based on the specific categories;
   display the filtered one or more RFID tags;
   receive a selection of an RFID tag based on the displayed filtered one or more RFID tags; and receive RFID information and location information associated with the selected RFID tag on the wireless device and at least store the RFID information and location information in storage for later retrieval, wherein the RFID information is at least a URL to gain access to a website or a web service, and the location information includes the location of the selected RFID tag, wherein the infrastructure is operable to provide tonal alerts that correspond and are unique to the specific categories associated with the RFID information, and wherein the specific categories associated with the RFID information comprise at least two of a realty category, a dining category, a lodging category, a theatre category, and a retail category.

2. The method for providing content using RFID of claim 1, wherein the infrastructure is at least one of maintained, deployed, serviced and configured by a service provider.

3. The method for providing content using RFID of claim 1, wherein the RFID information is provided on a fee and/or advertisement basis.

4. The method for providing content using RFID of claim 1, wherein the infrastructure is operable to provide electronic coupons associated with the RFID information.

5. The method for providing content using RFID of claim 1, wherein the infrastructure is operable to provide web services or a website associated with the RFID information.

6. The method for providing content using RFID of claim 1, wherein the infrastructure is further operable to:
open the URL associated with the RFID information received from the RFID tag on the wireless device; and
display the website or web service associated with the URL on the wireless device.

7. The method for providing content using RFID of claim 1, wherein the infrastructure is further operable to use the RFID information to connect with a content provider to obtain information related to an RFID source location information associated with the RFID tag.

8. The method for providing content using RFID of claim 7, wherein the location information is received from one of GPS and radio frequency triangulation associated with the RFID information.

9. The method for providing content using RFID of claim 8, wherein the infrastructure is further operable to use the location information to obtain directions or an exact location of the RFID tag.

10. The method for providing content using RFID of claim 9, wherein the website or the web service provides the information related the RFID source, and the URL can be retrieved and used to display the website or web service on the infrastructure.

11. The method for providing content using RFID of claim 1, further comprising prompting a user to store the RFID information on the wireless device or to retrieve the RFID information immediately.

12. The method for providing content using RFID of claim 1, wherein the scanning is performed passively or actively in a vicinity of the wireless device for the one or more RFID tags.

13. The method for providing content using RFID of claim 1, wherein:
when more than one RFID tag is detected, display a list of the filtered one or more RFID tags, the list comprising a title of each of the detected RFID tags;
when only one RFID tag is detected, display the RFID tag;
when the wireless device fails to detect the one or more RFID tags:
display a no discovery notice; and
prompt a user as whether to continue the scanning for the one or more RFID tags or to terminate the scanning.

14. The method for providing content using RFID of claim 1, wherein the infrastructure is operable to filter the one or more RFID tags based on at least one of price and the location information.

15. The method for providing content using RFID of claim 1, wherein the receiving the selection of the RFID tag based on the displayed filtered one or more RFID tags comprises receiving the selection of a title of the RFID tag based on the displayed filtered one or more RFID tags.

* * * * *